July 15, 1930.  D. J. BARNARD  1,770,453
GRAB
Filed Oct. 21, 1929  5 Sheets-Sheet 1

INVENTOR
Dudley James Barnard.
BY
ATTORNEY

July 15, 1930.  D. J. BARNARD  1,770,453
GRAB
Filed Oct. 21, 1929  5 Sheets-Sheet 2
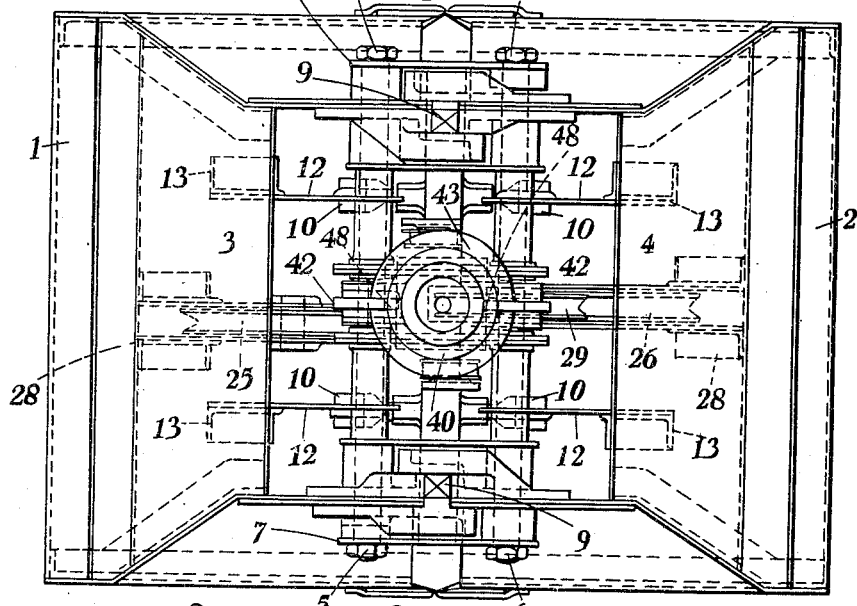
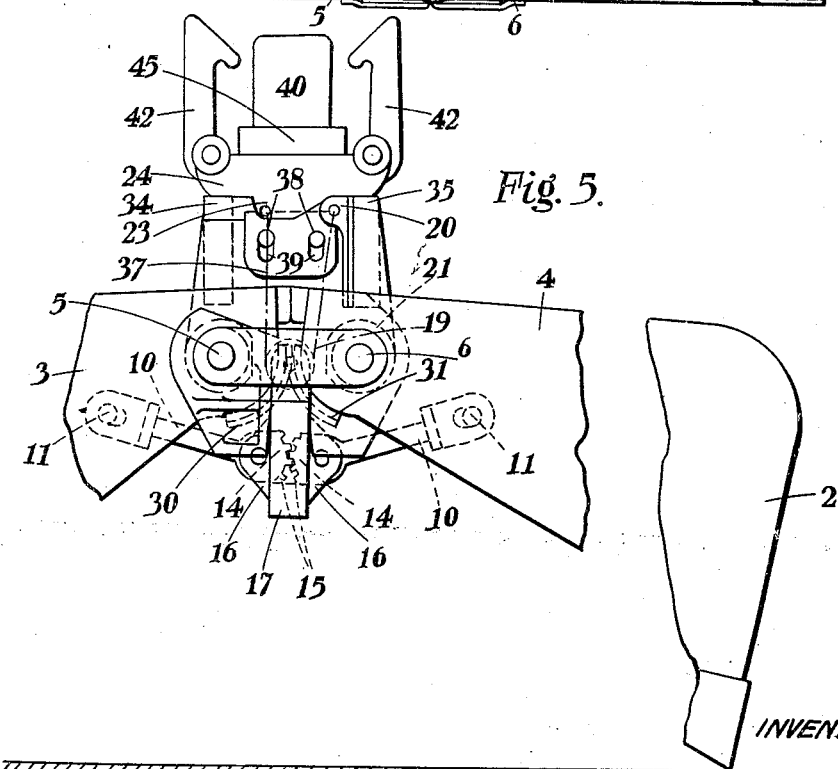
INVENTOR
Dudley James Barnard.
BY
ATTORNEY July 15, 1930. D. J. BARNARD 1,770,453
GRAB
Filed Oct. 21, 1929 5 Sheets-Sheet 3
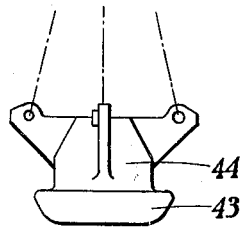
Fig. 3.
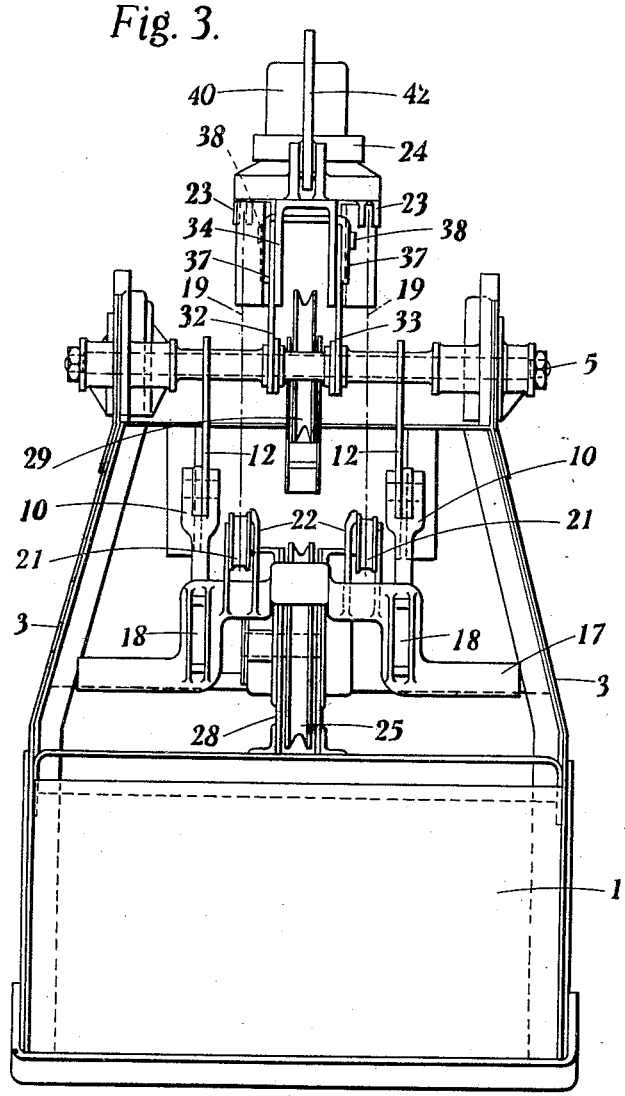
INVENTOR
Dudley James Barnard.
BY
ATTORNEY

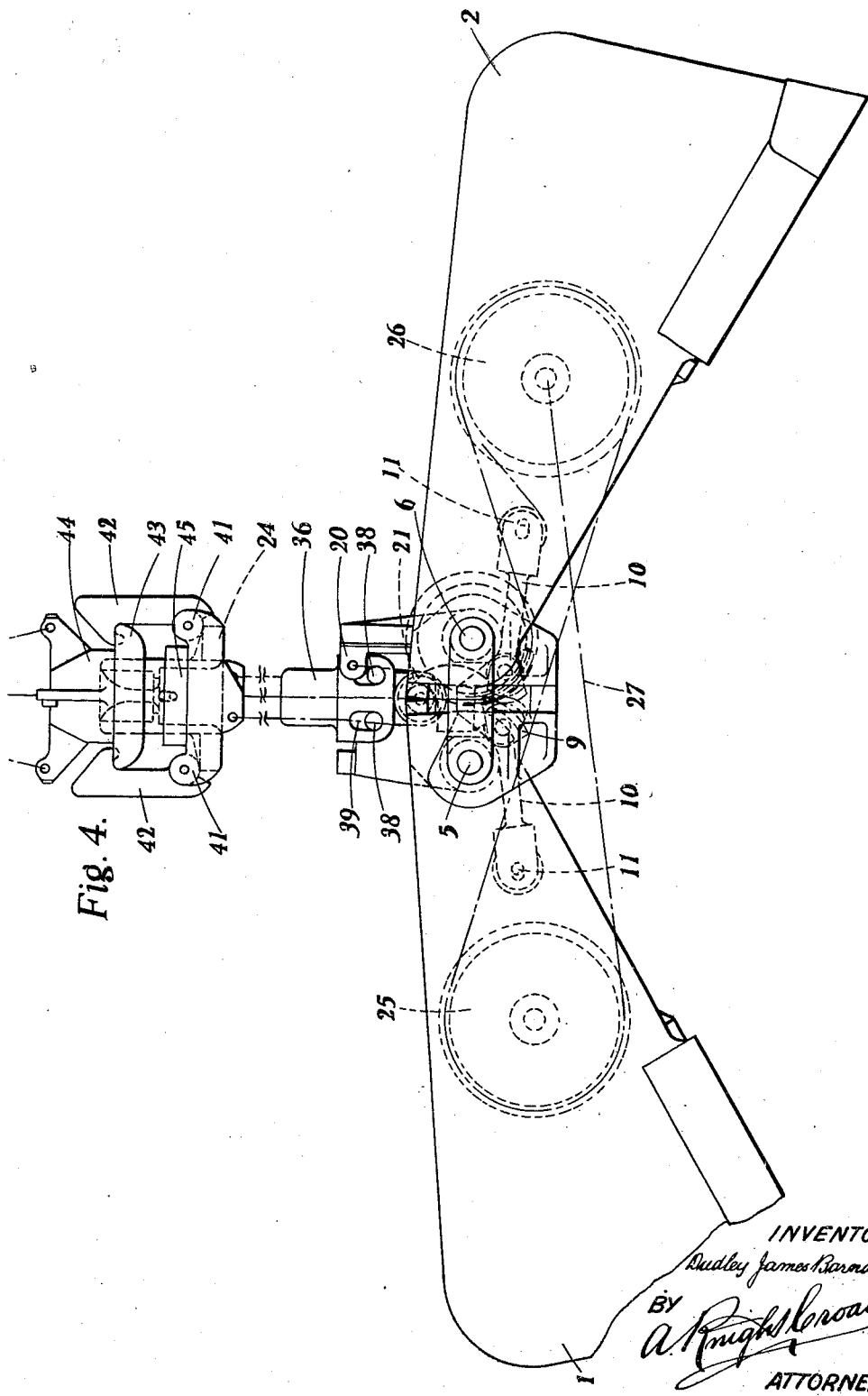

July 15, 1930.  D. J. BARNARD  1,770,453
GRAB
Filed Oct. 21, 1929  5 Sheets-Sheet 5

INVENTOR
Dudley James Barnard
BY
ATTORNEY

Patented July 15, 1930

1,770,453

UNITED STATES PATENT OFFICE

DUDLEY JAMES BARNARD, OF BARKING, ENGLAND

GRAB

Application filed October 21, 1929, Serial No. 401,201, and in Great Britain November 15, 1928.

This invention relates to grabs, and more particularly to what are known as scraper grabs which have a span when open considerably greater than the total height of the grab when closed, and it has for its principal object a construction which enables all movements of the grab to be effected by a single chain or rope thereby enabling said grab to be used with any simple single chain crane.

According to this invention the grab is composed of two scoops the spreader arms of which are rigid therewith and pivoted at their upper ends to a top cross bar on separate pivots. The upper ends of each pair of spreader arms are preferably provided with inter-engaging toothed members to assist in maintaining the balance of the grab when opening and to prevent any irregular movement of the spreader arms. The spreader arms are each provided with a pivoted link the lower free ends of which are connected to links slidable relatively to a cross-beam, said cross-beam being supported by the upper part of the grab. The purchase sheaves or pulleys for the hauling chain are mounted within the spreader arms and a single pulley is also provided on the top-cross-bar. The upper ends of the plates forming the spreader arms are shaped so that when the grab is opened the opposed faces are approximately parallel and spaced apart to enable parts formed on the cross-beam to pass between and to be gripped between said opposed faces on each side of the grab.

The head of the grab is provided with means for enabling the grab to be supported on the usual tipping ring and such means consists, according to the present invention, of a thimble like member secured to and having a limited vertical movement relative to the head of the grab. Concentrically arranged with respect to and sliding on the thimble is a ring-shaped member provided with hook-shaped elements adapted to engage with the tipping ring said ring-shaped member being connected by flexible connections with the cross-beam. The ring-shaped member is provided with a cylindrical extension upon which is arranged a further ring-shaped member furnished with inwardly disposed projections arranged to pass through vertically disposed slots in said cylindrical extension adapted to coact with the upper edge of the thimble.

Stops are provided at the head of the grab for the ring-shaped member to rest upon.

In the accompanying drawings which illustrate this invention:—

Figure 2 is a plan thereof.

Figure 3 is a front elevation thereof with certain parts removed to enable other parts to be shown more clearly.

Figure 4 is a side elevation showing the several parts when the scoops are open and the grab is supported on a tipping ring suspended from the jib of the crane.

Figure 5 is a side elevation of part of the grab showing the position of certain parts when the scoops are open and the grab is resting on the ground.

Figure 1:
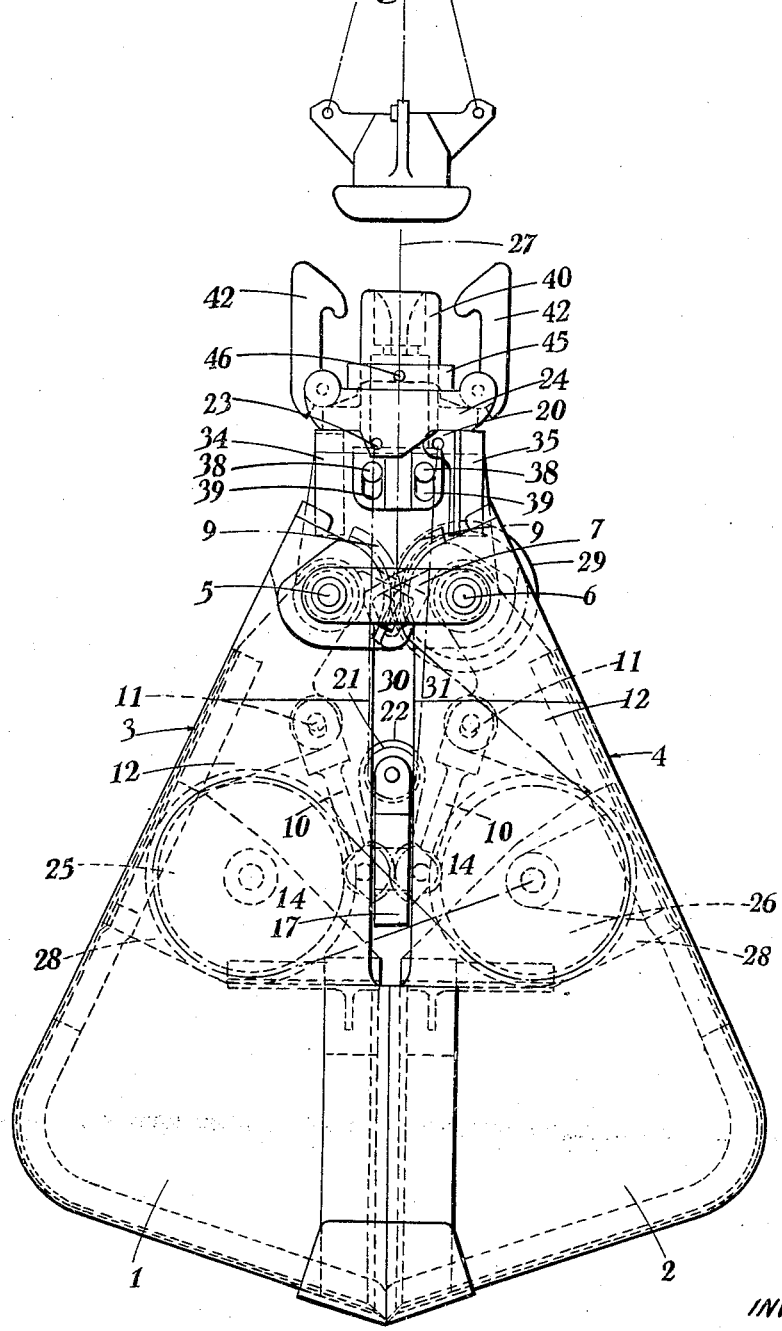
Figure 1 is a side elevation of a grab showing the position of the several parts when the scoops are closed and its weight supported by the hauling rope.
Figure 6:
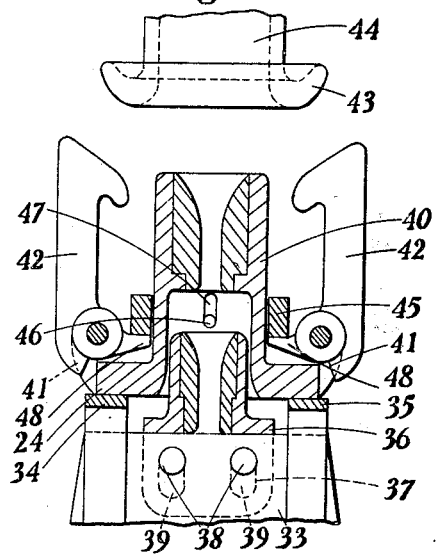
Figure 6 is a detail of the head of the grab showing the position of the hook-shaped elements prior to engagement with the tipping ring.

In the drawings 1 and 2 are the scoops 3 and 4 the spreader arms formed rigidly with the scoops and pivoted at their upper ends to the top cross bars 5 and 6 spaced apart by links 7 and 8. For the purpose of assisting in maintaining the balance of the grab when opening and to prevent any irregular movements of the spreader arms, the upper ends of each pair are furnished with inter-engaging teeth 9. The spreader arms 3 and 4 are each provided with a pair of oppositely disposed pivoted spreader links 10. The upper ends of the links 10 are forked and are pivoted by means of pins 11 to plates 12 secured at 13 to the spreader arms and to the cross-bars 5 and 6, the holes in the plates 12 to receive the pins 11 being slightly elongated to permit of a small degree of free movement for the purpose hereafter described. The lower ends of the spreader links 10 are provided with segments 14 furnished with teeth 15, and said links are pivoted in lugs 16 provided on the cross-beam 17 of the grab adjacent a slot 18 (Figure 3), the arrangement being such that the ends of the links 10 enter the slot 18 so as to enable the teeth 15 on the oppositely disposed links to engage as shown clearly in Figure 5. The cross-beam 17 is suspended from the head of the grab by means of chains 19 secured to lugs 20 located at the head of the grab and arranged to pass around pulleys 21 rotatably mounted in brackets 22 formed in one with or secured to the cross-beam 17 the other end of said chains being secured to lugs 23 provided on the underside of a ring shaped member 24 hereafter described. The purchase sheaves or pulleys 25 and 26 for the hauling rop 27 are mounted in brackets 28 secured within the spreader arms 3 and 4 and a single rope guide pulley 29 is mounted on the top-cross-bar 6. The upper ends of the spreader arms 3 and 4 on each side of the grab are provided with gripping members 30 and 31 so shaped that when the grab is opened the opposed faces are approximately parallel and spaced apart as shown in Figure 5 so as to enable the ends of the cross-beam 17 to pass between and to be gripped between said opposed faces on each side of the grab.

The head of the grab is provided with plates 32 and 33 to which are secured two inverted U-shaped members 34 and 35 adapted to form a seating for the ring shaped member 24 above referred to. A thimble like member 36 furnished with depending legs 37 is placed between the members 34 and 35, said legs 37 being adapted to straddle the plates 32, 33 which are each provided with pins 38 adapted to engage slots 39 provided in the legs 37 so as to enable the part 36 to have a limited vertical movement relative to the head of the grab.

The ring shaped member 24 above referred to is provided with an upwardly directed tubular extension 40 and with a pair of oppositely disposed brackets 41 in which are pivoted a pair of hook-shaped elements 42 the upper ends of which are adapted to engage with the flange 43 on the tipping ring 44 carried by the jib of the crane. The member 24 is further provided with an annular ring 45 furnished with a pair of oppositely disposed pins 46 adapted to slide in slots 47 provided in the wall of the tubular extension 40 thereby enabling the ring 45 to have a limited vertical movement on said extension. The ring 45 is normally adapted to rest on projections 48 formed on the lower ends of the hook-shaped elements 42, said ring being of sufficient weight to counteract the tendency of the elements 42 to fall outwardly due to gravity. The member 36 is normally adapted to project within the lower part of the tubular extension 40 and under certain conditions to bear against the inwardly projecting pins 45 so as to lift same into the position shown in Figure 8.

The operation of the grab having its parts constructed and arranged as above described will now be explained.

Figure 7:
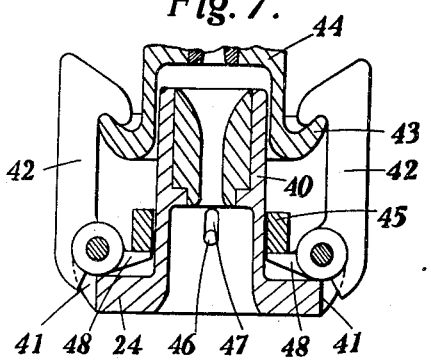
Figure 7 is a similar detail showing the hook-shaped elements in engagement with the tipping ring, and, Figure 8 is a side elevation of the head of the grab (the scoops being open as in Figure 4) showing the position of the parts as the weight of the grab is taken by the hauling rope the hook-shaped elements being simultaneously released from the tipping ring.

Assuming the grab to be loaded and the weight of the grab and its load supported by the hauling rope 27 the parts will then occupy the position shown in Figures 1, 2, 3 and 6; when it is desired to discharge the load, the hauling rope 27 is drawn in and the grab raised until the hook-shaped elements 42 engage with the underside of the flange 43 on the tipping ring 44 which moves the upper ends outwardly against the action of the ring 45; as soon as the hooks pass the flange 43 the weight of the ring 45 causes the hooks to move inwardly into the position shown in Figure 7. With the parts in this position the hauling rope 27 is paid out, immediately the head of the grab falls away from the ring member 24 the weight of the grab and its contents is taken by the chains 19 and the scoops are forced apart by the spreader links 10 due to the pull of the chains on the cross beam 17, until they reach the fully open position when the cross-beam 17 will be drawn between the two gripping members 30, 31. When the maximum falling movement of the grab has taken place the links 10 will have moved into a position slightly beyond the centre as shown in Figure 4, and the brackets 22 will bear against the underside of the legs 37 thereby lifting the member 36 until the lower ends of the slots 39 are brought up against the pins 38 (Figure 8).

Figure 8:
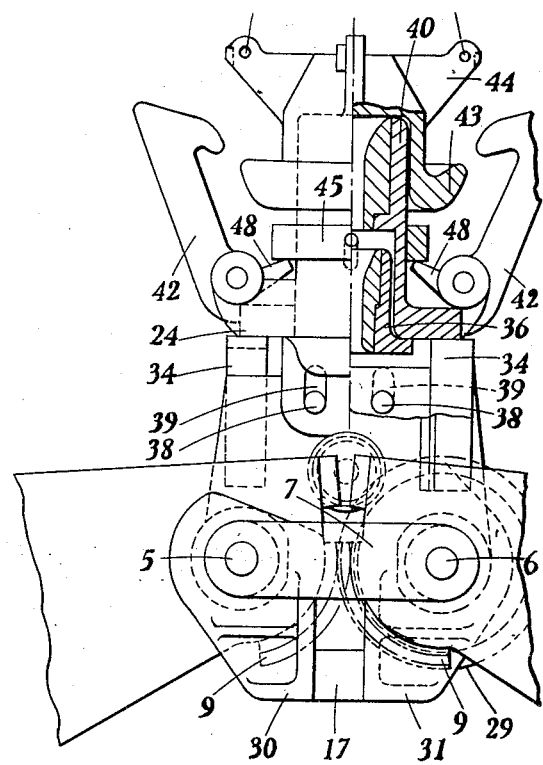

In order to remove the grab from the tipping ring 44 to enable a further load to be raised by the grab, the hauling rope 27 is again drawn in until the thimble 36 enters the tubular extension 40 of the ring shaped member 24 and bears against the pins 46 and when the members 34 and 35 make contact with the underside of the member 24, the projections 48 on the elements 42 being freed from the weight of the ring 24, the elements 42 will fall outwardly by gravity away from the flange 43 the parts then occupying the position shown in Figure 8. If the rope 27 is now paid out the grab may be lowered, with the parts still in the position described, onto the ground or material to be raised and when this occurs the grip of the parts 30, 31 on the beam 17 will be immediately released.

To close the grab the hauling rope 27 is paid out slightly; this allows the cross-beam 17 to fall into the position shown in Figure 5 due to the small amount of free movement allowed for by the elongated slots in which the pins 11 operate. The continued downward movement of the cross-beam removes the upper ends of the brackets 22 from contact with the legs 37 thereby permitting the thimble 36 and ring 45 to fall and the upper ends of the elements 42 to be drawn inwardly ready for engagement with the tipping ring 44. The hauling rope is paid out to an extent which will allow the cross-beam to pass completely from between the parts 30, 31 after which the grab may be closed by drawing in the hauling rope.

What I claim is:—

1. In a grab of the kind herein described having a pair of scoops, spreader arms rigidly connected therewith, separate top cross bars on which said spreader arms are pivoted, a cross-beam suspended from the head of the grab, means connecting said cross-beam with the spreader arms, a tipping ring, the combination of devices located at the head of the grab adapted to coact with said tipping ring, means carried by the cross-beam adapted to move said devices out of engagement and out of the path of said tipping ring, a plurality of sheaves mounted within the spreader arms and at the head of the grab and a single rope for controlling the movements of the grab.

2. In a grab of the kind herein described comprising a pair of scoops, spreader arms rigidly connected therewith, gripping members formed on the upper ends of said arms, a separate top-cross-bar for each pair of spreader arms, links for connecting said top-cross-bars, plates secured to said top-cross-bars, a thimble like member supported by and having a limited vertical movement on said plates, a plurality of devices supported on said plates including a pair of hook-shaped members, a cross-beam supported by one of said devices, means connecting said cross-beam with the spreader arms, a tipping ring with which said hook-shaped members engage, means on the cross-beam adapted to coact with the thimble like member to move the hook shaped members out of engagement with said tipping ring, a plurality of purchase sheaves mounted within the spreader arms and on one of the top-cross-bars and a single rope for controlling the movements of said grab.

3. A scraper grab having a pair of scoops, a pair of spreader arms rigidly connected to each scoop, gripping members formed on the upper ends of each spreader arm, a separate top-cross-bar for each pair of spreader arms, means for maintaining said top-cross-bars in parallel relation, a pair of plates carried by said cross-bars, a thimble like member supported by and having a limited vertical movement on said plates, a plurality of devices supported on said plates including a pair of hook-shaped elements, a second pair of plates carried by said cross-bars and spreader arms, a cross-beam, a plurality of links pivotally connected to said second named plates and to said cross-beam, flexible means connecting the head of the grab with said cross-beam, a tipping ring, with which said hook-shaped elements engage, means on the cross-beam adapted to coact with the thimble like member to permit the hook-shaped elements to fall out of engagement with the tipping ring, a plurality of purchase sheaves mounted within the spreader arms and on one of the top-cross-bars and a single rope for controlling all the movements of said grab.

4. A scraper grab having a pair of scoops, a pair of spreader arms rigidly connected to each scoop, gripping members formed on the upper ends of each spreader arm, a separate top-cross-bar for each pair of spreader arms, a plurality of devices for maintaining said top-cross-bars in parallel relation, a combination of devices located at the head of the grab including a pair of hook-shaped elements, a second pair of plates carried by said cross-bars, a cross-beam, two pairs of links pivotally connected to said downwardly projecting plates and to said cross-beam, interengaging teeth formed on the lower ends of said links, flexible means connecting the devices at the head of the grab with said cross beam, a tipping ring, with which said hook shaped elements engage, means on the cross beam adapted to coact with means at the head of the grab for releasing the hook-shaped elements from engagement with the tipping ring, a plurality of purchase sheaves mounted within the spreader arms and on one of the top-cross-bars and a single rope for controlling all the movements of said grab.

5. A scraper grab having a pair of scoops, a pair of spreader arms rigidly connected to each scoop, gripping members formed on the upper ends of each spreader arm, a separate top-cross bar for each pair of spreader arms, a plurality of links for maintaining said top-cross-bars in parallel relation, a pair of upwardly projecting plates carried by said cross-bars, a thimble like member supported on and having a limited vertical movement on said plates, a ring shaped member supported on said plates and concentrically disposed relatively to the thimble like member, a pair of hook-shaped elements pivotally connected to said ring-shaped member, a slidable ring, mounted on said ring-shaped member for maintaining the hook-shaped elements in a vertical position, a pair of downwardly projecting plates carried by said cross-bars, a cross-beam, two pairs of links pivotally connected to said downwardly projecting plates and to said cross-beam, interengaging teeth formed on the lower ends of said links, flexible means connecting the ring-shaped member with said cross-beam, a tipping ring, with which said hook shaped elements engage, means on the cross beam adapted to coact with the thimble like member to lift the slidable ring and permit the hook-shaped elements to fall out of engagement with the tipping ring, a plurality of purchase sheaves mounted within the spreader arms and on one of the top-cross-bars and a single rope for controlling all the movements of said grab.

6. A scraper grab having a pair of scoops, a pair of spreader arms rigidly connected to each scoop, gripping members formed on the upper ends of each spreader arm, a cross-beam suspended from the head of the grab arranged so that its ends may be gripped between said gripping members on the spreader arms when the grab is open, a tipping ring, a combination of devices arranged on the head of the grab adapted to engage with said tipping ring, means on said cross-beam adapted to coact with said devices to release same from engagement with the tipping ring and a single rope for controlling all the movements of said grab.

DUDLEY JAMES BARNARD.